Apr. 24, 1923.
W. TRIBBLE
1,452,768
SHIPPING CONTAINER
Filed June 22, 1922
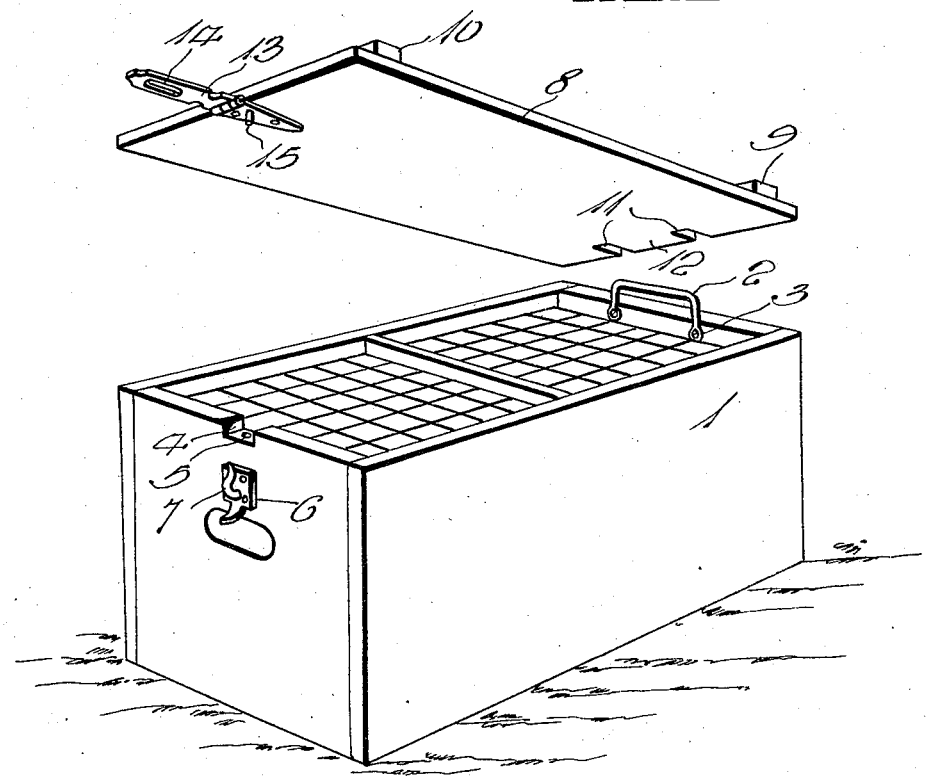
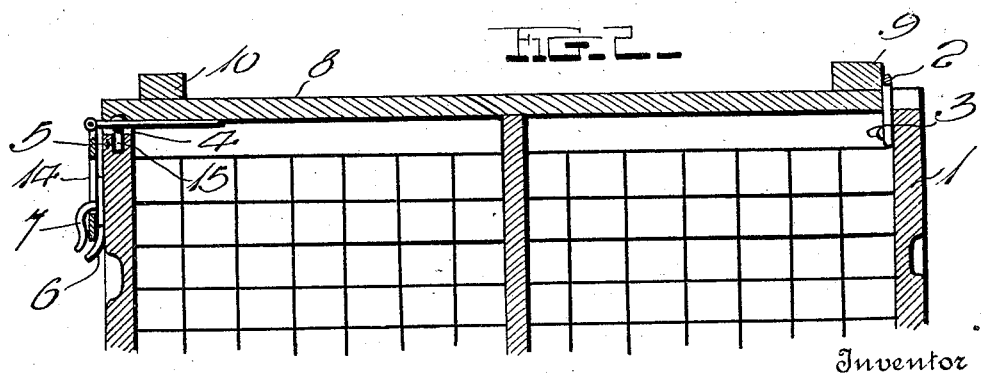
Witness
H. Woodard
Inventor
W. TRIBBLE
By H. R. Wilson & Co.
Attorneys Patented Apr. 24, 1923.

1,452,768

UNITED STATES PATENT OFFICE.

WALTER TRIBBLE, OF OAKLAND, CALIFORNIA.

SHIPPING CONTAINER.

Application filed June 22, 1922. Serial No. 570,131.

*To all whom it may concern:*

Be it known that I, WALTER TRIBBLE, a citizen of the United States, residing at Oakland, in the county of Alameda and State of California, have invented certain new and useful Improvements in Shipping Containers, of which the following is a specification, reference being had therein to the accompanying drawing.

This invention relates generally to receptacles, but particularly to storing or shipping containers and the like.

The invention has been designed in order to provide a shipping container such as an egg crate with an improved lid construction in which the lid proper may be securely held in place upon the receptacle body when desired and so that it can be quickly and easily unfastened from the receptacle body and entirely removed therefrom.

The improved lid construction is of very simple and durable mechanical construction, and the novelty therein resides in the unique combination and arrangement of parts and the various details of construction, hereinafter fully described and claimed and illustrated in the accompanying drawings which form a part of this specification.

In the drawings:—

Figure 1 is a perspective view of an egg crate provided with a lid construction embodying the principles of the present invention; and Figure 2 is a central vertical longitudinal sectional view of the upper portion of the crate, showing the lid fastened thereon.

In the accompanying drawings in which a practical embodiment of the invention is illustrated and throughout which similar reference numerals are used to designate corresponding parts, the numeral 1 represents a box-like receptacle, which may be an egg, vegetable or other storing or shipping crate.

One end of the receptacle 1 carries an upstanding loop 2, which is preferably in the form of an inverted U-shaped rod or wire having eyes at its free ends, these eyes being designed to receive screws or other suitable securing elements for fastening the loop to the inner surface of one end of the receptacle 1.

The upper edge of the other end of the receptacle 1 is provided with a notch 4, and in the bottom of this notch 4 is a socket 5. The purposes of these parts will be hereinafter described.

Secured to the last mentioned end of the receptacle 1 by means of screws or other securing elements is a plate 6, which carries a turnably mounted hook 7 adapted to extend upwardly when in one position and to extend downwardly when in another position.

The lid of the receptacle 1 designated by the numeral 8 consists of a flat board-like member of a shape and size to correspond with the upper open side of the receptacle 1. The lid 8 is preferably provided with transversely extending cleats 9 and 10. These cleats 9 and 10 are disposed upon the upper side of the lid 8 and are spaced short distances from the ends thereof.

One end of the lid 8 is provided with a pair of notches 11, which form between them a tongue 12. The notches 11 are spaced apart the same distance as the upright portions of the rod or wire which forms the loop 2, so that the notches will receive the upright portions of the loop and the latter will receive the tongue 12.

Secured to the other end of the lid 8, preferably to its lower side, is the attaching leaf of a hinged hasp 13. This is placed so that the attaching leaf of the hasp 13 will fit within the notch 4 disposed in one end of the receptacle 1, and so that the swinging leaf of the hasp will swing over the hook 7 when the latter is in its upwardly projecting position in order that it may extend through the opening 5 in the hasp and can be turned so as to project downwardly to prevent the swinging leaf of the hasp from being disengaged from the hook.

In order to prevent longitudinal shifting of the lid 8 with respect to the receptacle 1, the lid is provided with a projection 14, which is engageable with the socket 5 formed in the bottom of the notch 4 cut in the receptacle 1. Of course, when the hook 7 is in locking engagement with swinging leaf of the hasp 13, very little longitudinal shifting of the lid with respect to the receptacle 1 may take place, but nevertheless, the projection 15 has been provided to constitute a means independent of the hook 7 and hasp 13 to prevent longitudinal shifting of the lid 8 with respect to the receptacle 1.

From the foregoing it will be seen that the lid 8 is detachable as a whole from the receptacle 1, and that it can be very quickly and easily attached and fastened on to the receptacle and just as easily and quickly unfastened and removed therefrom. It will also be seen that in order to place the lid 8 upon the receptacle 1 and lock it in place it is only necessary to place the lid upon the open side of the receptacle and move it longitudinally with respect to the latter so that the tongue 12 will be inserted in the loop 2 and so that the projection 15 will be inserted into the socket 5. When in this position the horizontal portion of the loop 2 will bear against the ends of the notches 11 and the cleat 9 and prevent longitudinal shifting of the lid 8 with respect to the receptacle 7 in one direction, while the projection 15 fitting in the socket 5 will prevent longitudinal shifting of the lid 8 with respect to the receptacle in both directions. After the parts have been assembled in this manner the swinging leaf of the hasp 13 may be swung downwardly so that the hook 7 may when in upwardly extending position pass through the opening 14 and then be turned so as to project downwardly and thereby lock the lid in place.

The invention as will be seen is of extremely simple and inexpensive construction and yet it is strong and durable.

It is to be understood that such changes in form, proportion, and in the minor details of construction, which may be made without departing from the spirit and principle of the invention may be made within the meaning and scope of the appended claims.

I claim:

1. A shipping container or the like comprising a box-like receptacle, a lid therefore, an upstanding loop carried by one end of said receptacle, a tongue projecting longitudinally from one end of said lid and adapted to be inserted through said loop for detachably fastening one end of said lid to said receptacle, and means for releasably fastening the other end of said lid to the other end of said receptacle.

2. A shipping container or the like comprising a box-like receptacle, a lid therefor, an upstanding loop carried by one end of said receptacle, a tongue projecting longitudinally from one end of said lid and adapted to be inserted through said loop for detachably fastening one end of said lid to said receptacle, and interengaging means carried by the other end of said receptacle and the other end of said lid for detachably fastening said other end of said lid to said other end of said receptacle.

3. A shipping container or the like comprising a box-like receptacle, a lid therefor, an upstanding loop carried by one end of said receptacle, one end of said lid being provided with a pair of spaced notches forming between them a tongue adapted to be inserted through said loop for detachably fastening one end of said lid to said receptacle, and interengaging means carried by the other end of said receptacle and the other end of said lid for detachably fastening said other end of said lid to said other end of said receptacle.

4. A shipping container or the like comprising a box-like receptacle, a lid therefor, means carried by one end of the receptacle for receiving and detachably fastening one end of said lid thereto, interengaging means carried by the other end of said receptacle and the other end of said lid for detachably fastening said other end of said lid to said other end of said receptacle, said other end of said receptacle being provided a socket and a projection carried by said other end of said lid and being engageable with said socket to maintain the first mentioned end of said lid in engagement with the first mentioned means independently of the last mentioned means.

5. A shipping container or the like comprising a box-like receptacle, a lid therefor, an upstanding loop carried by one end of said receptacle, a tongue projecting longitudinally from one end of the lid and adapted to be inserted through said loop to hold said end of the lid against upward movement, and means for releasably connecting the other end portion of said cover with the other end of said receptacle to releasably hold the said end of the cover against upward movement, said means including means for holding the cover against longitudinal movement in a direction to move said tongue out of said loop when in an operative position.

In testimony whereof I hereunto affix my signature.

WALTER TRIBBLE.